(12) United States Patent
Kodama et al.

(10) Patent No.: US 8,748,778 B2
(45) Date of Patent: Jun. 10, 2014

(54) STAINLESS STEEL FLUX-CORED WELDING WIRE FOR WELDING OF ZINC-COATED STEEL SHEET AND ARC WELDING METHOD OF ZINC-COATED STEEL SHEET USING SAME

(75) Inventors: Shinji Kodama, Tokyo (JP); Kenichi Asai, Tokyo (JP); Manabu Mizumoto, Tokyo (JP); Yoshinari Ishida, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 521 days.

(21) Appl. No.: 13/142,073

(22) PCT Filed: Jun. 26, 2009

(86) PCT No.: PCT/JP2009/062161
§ 371 (c)(1),
(2), (4) Date: Jun. 24, 2011

(87) PCT Pub. No.: WO2010/073763
PCT Pub. Date: Jul. 1, 2010

(65) Prior Publication Data
US 2011/0253691 A1 Oct. 20, 2011

(30) Foreign Application Priority Data
Dec. 26, 2008 (JP) .................................. 2008-333667

(51) Int. Cl.
*B23K 33/00* (2006.01)
*B23K 35/02* (2006.01)
(52) U.S. Cl.
USPC .................................. 219/137 R; 219/145.22
(58) Field of Classification Search
USPC .......................................... 219/145.1–146.52
See application file for complete search history.

(56) References Cited

U.S. PATENT DOCUMENTS 5,120,931 A * 6/1992 Kotecki et al. ............ 219/146.22
6,476,356 B2 * 11/2002 Kim .......................... 219/145.22
(Continued)

FOREIGN PATENT DOCUMENTS

| JP | 63-123596 A | 5/1988 |
| JP | 3-294094 A | 12/1991 |

(Continued)

OTHER PUBLICATIONS

International Search Report, PCT/JP2009/062161, Aug. 18, 2009.

*Primary Examiner* — Sang Y Paik
(74) *Attorney, Agent, or Firm* — Birch, Stewart, Kolasch & Birch, LLP

(57) ABSTRACT

A stainless steel flux-cored welding wire for zinc-coated steel sheet welding use which gives a weld zone where no zinc embrittlement cracking occurs and the corrosion resistance and ductility are excellent and which is good in weld work efficiency and a welding method using the same, the welding wire characterized in that total amounts of elements which are included as metals or alloy compositions in the sheath and flux are, by mass % with respect to a total mass of the welding wire, C: 0.01 to 0.05%, Si: 0.1 to 1.5%, Mn: 0.5 to 3.0%, Ni: 7.0 to 10.0%, and Cr: 26.0 to 30.0%, an F value is 30 to 50 in range, further, the wire contains, as slag forming agents, in the flux, by mass % with respect to the total mass of the wire, $TiO_2$: 3.8 to 6.8%, $SiO_2$: 1.8 to 3.2%, $ZrO_2$: 1.3% or less, and $Al_2O_3$: 0.5% or less, a total amount of the slag forming agent and other slag forming agents is 7.5 to 10.5%, furthermore, the $TiO_2$ satisfies, by mass % with respect to the total amount of slag forming agents, $TiO_2$: 50 to 65%, and a balance of the sheath and flux is Fe and unavoidable impurities.

5 Claims, 4 Drawing Sheets

(56) References Cited

U.S. PATENT DOCUMENTS

2002/0148533 A1* 10/2002 Kim et al. .................. 148/24
2008/0093352 A1* 4/2008 Jang et al. ................ 219/145.22
2009/0158889 A1 6/2009 Kodama et al.

FOREIGN PATENT DOCUMENTS

| | | | |
|---|---|---|---|
| JP | 8-267282 | A | 10/1996 |
| JP | 9-150295 | A | 6/1997 |
| JP | 2000-64061 | A | 2/2000 |
| JP | 2001-9589 | A | 1/2001 |
| JP | 2002-307189 | A | 10/2002 |
| JP | 2006-35293 | A | 2/2006 |
| JP | 2007-118077 | A | 5/2007 |
| JP | 2007-229781 | A | 9/2007 |
| JP | 2008-30121 | A | 2/2008 |
| JP | 2008-221292 | A | 9/2008 |
| RU | 2 247 888 | C2 | 3/2005 |

\* cited by examiner

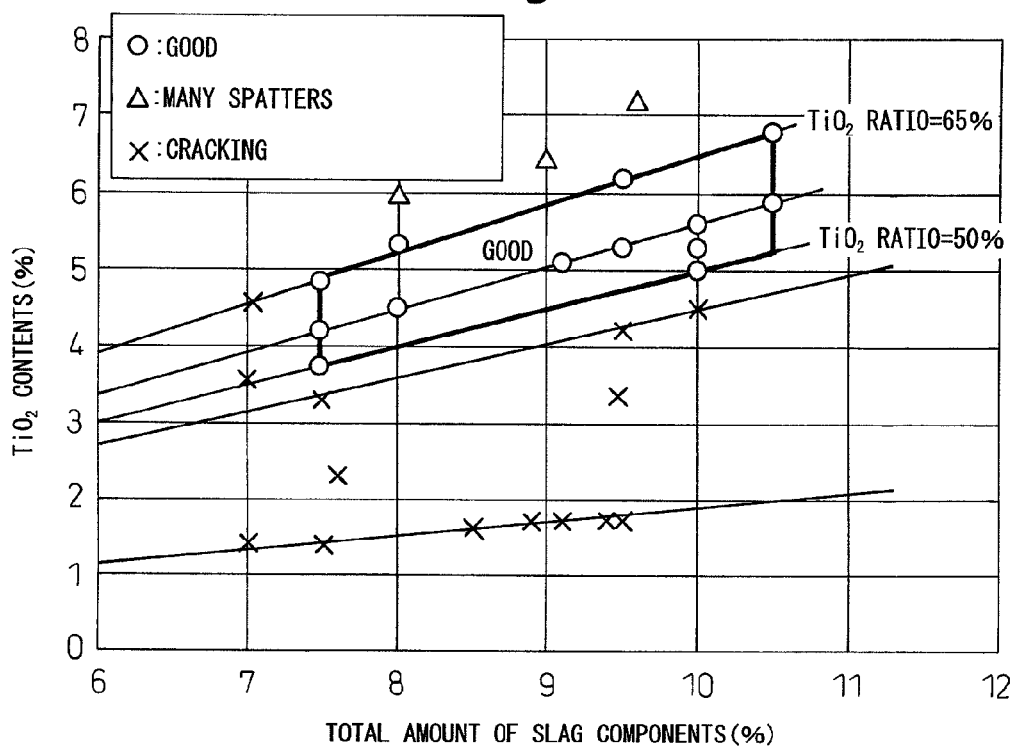
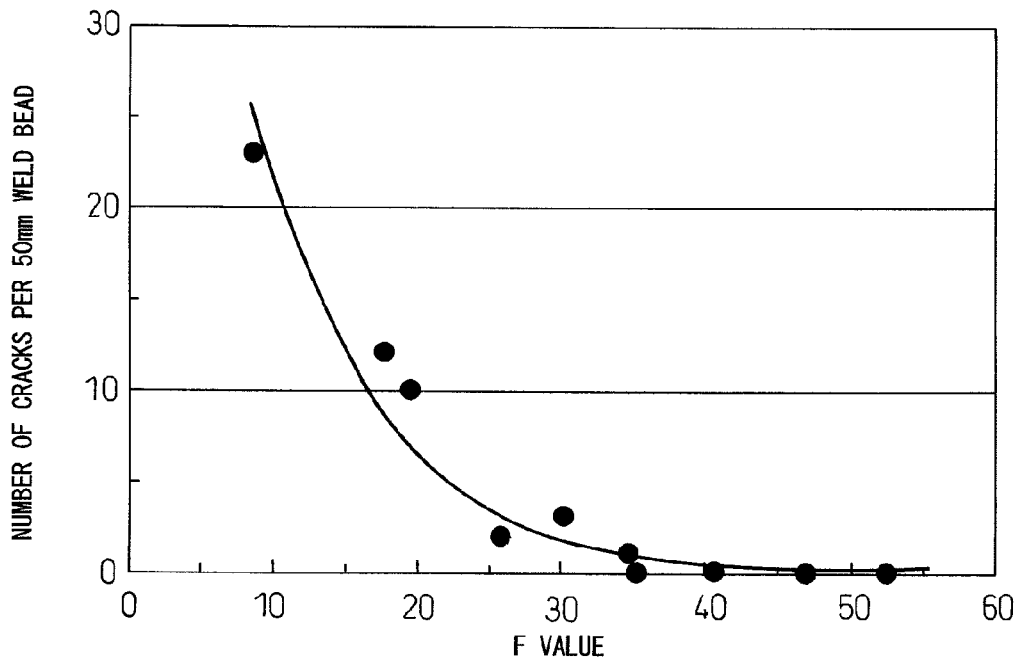

STAINLESS STEEL FLUX-CORED WELDING WIRE FOR WELDING OF ZINC-COATED STEEL SHEET AND ARC WELDING METHOD OF ZINC-COATED STEEL SHEET USING SAME

TECHNICAL FIELD

The present invention relates to stainless steel flux-cored welding wire for zinc-coated steel sheet welding use which can secure corrosion resistance of the weld zone even without touchup or other post treatment and an arc welding method of zinc-coated steel sheet using the same, more particularly relates to stainless steel flux-cored welding wire for zinc-coated steel sheet welding use in which weld cracking does not occur and the weld work efficiency is good and an arc welding method of zinc-coated steel sheet of the same.

Note that, the zinc-coated steel sheet of the welded material covered by the present invention includes zinc-coated steel sheet and zinc-based alloy coated steel sheet.

BACKGROUND ART

Zinc-coated steel sheet is being broadly used in the fields of construction, automobiles, etc. from the viewpoint of improvement of the corrosion resistance of structural members. For improvement of the corrosion resistance in conventional structures, the method has been used of welding together non-plated members, then dipping the assembly in a zinc bath to make zinc deposit on the surface of the steel material and weld zone and secure the corrosion resistance of the structure as a whole. However, with this method, since the plating is performed after welding, the productivity is inferior. Also, a plating bath and other facilities become necessary. This became a cause of increase of the manufacturing costs.

To avoid this, the method of producing a structure by welding together zinc-coated steel sheets which have been plated in advance has come to be applied. Further, recently, to better improve the corrosion resistance of structural members, the practice has been to produce welded structures by welding together zinc-based alloy coated steel sheets given a Zn—Al—Mg—Si-based alloy plating or other zinc-based alloy coating on the surface of the steel sheets so as to further raise the corrosion resistance compared with general zinc-coated steel sheet (for example, see PLT 1).

As a unique problem when producing a welded structure by welding together zinc-coated steel sheets or zinc-based alloy coated steel sheets, it has been known in the past that liquid metal embrittlement cracking due to hot dip plating (below, referred to as "zinc embrittlement cracking") easily occurs in the weld metal and base metal heat affected zone.

Zinc embrittlement cracking is believed to be mainly due to the zinc plating components, which remain in a molten state at the surface of the base metal heat affected zone present near the weld zone, penetrating to the crystal grain boundaries at the weld zone. Note that, the zinc plating which was present at the surface of the weld zone is dispersed away by the welding, so it is believed that this does not become the cause of weld embrittlement cracking.

On the other hand, for the welding of stainless steel structures from which corrosion resistance was demanded in the past, an alloy welding material of stainless steel has been used. In this case, even with weld metal of stainless steel components which is formed at the joined parts of the stainless steel with itself or stainless steel and carbon steel, an excellent corrosion resistance is obtained in the same way as the base material part of stainless steel.

However, according to the results of confirmation tests by the inventors, to obtain a weld metal with a good corrosion resistance when welding zinc-coated steel sheet, for example, it was confirmed that even if using a SUS309-based or SUS329-based stainless steel welding material or other welding material, a large number of zinc embrittlement cracks occur at the weld metal and therefore application becomes difficult.

As the method for solving the problem of the zinc embrittlement cracking of weld metal, the inventors proposed to control the amounts of C, Si, Mn, Ni, and Cr obtain a suitable area percentage of ferrite structures in the weld metal and tensile strength and furthermore to control the amount of $TiO_2$ in the slag forming agent etc. in flux-cored welding wire to suitable values to prevent zinc embrittlement cracking in the weld metal (see PLT 2).

However, when using this method to weld zinc-based alloy coated steel sheet, depending on the welding conditions, zinc embrittlement cracking of the weld metal often occurs. It was not possible to stably prevent this. Further, there were the problems that the welded metal obtained by this method was low in ductility and further the arc stability in weld work efficiency was low and the slag detachability was poor.

To deal with this, the inventors engaged in further in-depth research on welded joints preventing weld embrittlement cracking and proposed the means of defining the weld metal components of the joint so as to suppress zinc embrittlement cracking occurring at the weld metal (see PLT 3). Furthermore, in that PLT, they proposed the means of defining the alloy composition of the welding wire so as to adjust the weld metal components of the joint to targeted ranges.

CITATION LIST

Patent Literature

PLT 1
  Japanese Patent Publication (A) No. 2000-064061
PLT 2
  Japanese Patent Publication (A) No. 2006-035293
PLT 3
  Japanese Patent Publication (A) No. 2007-118077

SUMMARY OF INVENTION

Technical Problem

As the zinc embrittlement cracking which occurs at a weld zone, cracking which occurs at the weld metal such as shown in FIG. 3A and FIG. 3B and cracking which occurs from the weld toe to the base metal heat affected zone such as shown in FIG. 4A and FIG. 4B may be mentioned as typical examples.

Among these, the inventors learned that zinc embrittlement cracking o the weld metal such as shown in FIG. 3A and FIG. 3B can be suppressed by realizing weld material of the component composition described in PLT 3. However, for use as a welded joint, in addition to prevention of cracking, ductility of the weld zone and other mechanical performance are demanded. In the invention described in PLT 3, regarding the components of the welding material used, the ranges of C, Si, Mn, Ni, and Cr are shown, but the suitable balance of components is not disclosed. There was the problem that a large amount of trouble was required for advanced study so as to select the welding wire for satisfying the properties of the welded joint.

On the other hand, for cracking which occurs from the weld toe to the base metal heat affected zone such as shown in FIG. 4A and FIG. 4B, this does not become a problem in general welded joints, but, for example, cracking sometimes occurs in girth welding where the residual stress at the time of welding is considered high and in welding of square steel pipe where the constraining force of the weld zone material becomes high. This was a new problem. As the mechanism of occurrence of such cracking, as shown in FIG. 4A and FIG. 4B, it is believed that cracking 6 is caused by the zinc 5 present in a molten state at the steel sheet surface penetrating at the stress concentration zone, that is, from the weld toe 4 to the base metal heat affected zone 1a, in the cooling process after welding.

Note that, PLT 2 describes to prevent the zinc embrittlement cracking of the base metal heat affected zone by raising the ratio of the $TiO_2$ in the slag components in the welding wire to 60% or more, but in that PLT, the total amount of the slag forming agent is a relatively low 5% or less with respect to the total mass of the welding wire, due to the balance of formulation of the slag forming agent, spatter often occurs, etc. There is room for improvement of the weld work efficiency. Further, cracking sometimes occurred due to the welding conditions as well.

Therefore, the present invention has as its object the provision of stainless steel flux-cored welding wire for zinc-coated steel sheet welding use which prevents zinc embrittlement cracking and secures ductility of the weld metal in welding of zinc-coated steel sheet using a stainless steel welding material and, further, prevents zinc embrittlement cracking of the base metal heat affected zone and is excellent in weld work efficiency as well and the provision of an arc welding method of zinc-coated steel sheet using the same.

Solution to Problem

The inventors worked to solve the above problem by engaging in various studies on the alloy composition of welding wire. As a result, they discovered that by setting suitable amounts of C, Si, Mn, Ni, and Cr in the welding wire and increasing the total formula of the same, that is, the F value (=3×[Cr %]+4.5×[Si %]−2.8×[Ni %]−84×[C %]−1.4×[Mn %]−19.8), it is possible to reduce zinc embrittlement cracking and, furthermore, to secure ductility. FIG. 2 shows the relationship, for welding of zinc-coated steel sheet, between the F value and the number of cracks (welding conditions etc. are same as later explained performance survey of welded joint).

This F value is an indicator which shows the ease of precipitation of ferrite, but, as shown in FIG. 2, if the F value becomes 30 or more, preferably 40 or more, the solidification is completed in the ferrite single phase from the primary crystallization to room temperature, so it is believed penetration of zinc to the grain boundary is difficult and cracking can be prevented.

Further, the inventors studied the slag forming agent of welding wire for the prevention of the zinc embrittlement cracking of the base metal heat affected zone. As a result, they discovered that by setting a suitable ratio of content of $TiO_2$ in the slag forming agent in the welding wire and by making the total amount of the slag forming agents relatively larger, cracking can be prevented. That is, as shown in FIG. 5, it became clear that by covering the weld metal 3 well by a solidified slag 8 of a suitable component composition, the molten zinc 5 can be prevented from penetrating to the weld toe 4 and zinc embrittlement cracking of the base metal heat affected zone can be prevented.

The present invention was made based on the above discoveries and has as its gist the following:

[1] A stainless steel flux-cored welding wire for welding of a zinc-coated steel sheet, the welding wire comprised of a stainless steel sheath in which flux is filled, Characterized in that total amount of elements which are included as metals or alloy compositions in said sheath and flux are, by mass % with respect to a total mass of the welding wire, C, 0.01 to 0.05%,
Si: 0.1 to 1.5%,
Mn: 0.5 to 3.0%,
Ni: 7.0 to 10.0%, and
Cr: 26.0 to 30.0%, and
a F value which is defined by the following formula (1) is 30 to 50;

further, said flux comprises, as slag forming agents, by mass % with respect to the total mass of the wire, $TiO_2$: 3.8 to 6.8%,
$SiO_2$: 1.8 to 3.2%,
$ZrO_2$: 1.3% or less (including 0%), and
$Al_2O_3$: 0.5% or less (including 0%), and
a total amount of said slag forming agents and other slag forming agents is 7.5 to 10.5%;

furthermore, said $TiO_2$ satisfies, by mass % with respect to the total amount of slag forming agents, $TiO_2$: 50 to 65%;
a balance of said sheath and flux is Fe and unavoidable impurities.

$$F \text{ value} = 3 \times [Cr \%] + 4.5 \times [Si \%] - 2.8 \times [Ni \%] - 84 \times [C \%] - 1.4 \times [Mn \%] - 19.8 \qquad (1)$$

wherein [Cr %], [Si %], [Ni %], [C %], and [Mn %] respectively indicate totals of Cr, Si, Ni, C, and Mn contained in the sheath and wire in the welding wire with respect to the total mass of the wire.

[2] The stainless steel flux-cored welding wire for welding of the zinc-coated steel sheet as set forth in [1], further comprising Bi as a metal or alloy composition, and a total amount contained in said sheath and flux is, by mass % with respect to a total mass of the welding wire, Bi: 0.01 to 0.1%.

[3] An arc welding method of zinc-coated steel sheets characterized in that coating of the zinc-based alloy coated steel sheets is zinc-based alloy coating comprising, by mass %, Al: 2 to 19%,
Mg: 1 to 10%,
Si: 0.01 to 2% and
a balance of Zn and unavoidable impurities;
the zinc-coated steel sheets coated is arc welded, using the stainless steel flux-cored welding wire for welding of the zinc-based alloy coated steel sheet as set forth in [1] or [2].

[4] An arc welding method of zinc-coated steel sheet, characterized in that the steel sheet other than coating of the zinc-coated steel sheet comprises, by mass %, C, 0.01 to 0.2%,
Si: 0.01 to 2.0%,
Mn: 0.5 to 3.0%,
P: 0.020% or less,
S: 0.020% or less,
Al: 0.001 to 0.5%,
Ti: 0.001 to 0.5%, B: 0.0003 to 0.004%,
N: 0.0005 to 0.006% and
a balance of Fe and unavoidable impurities;
the zinc-coated steel sheets coated is arc welded, using the stainless steel flux-cored welding wire for zinc-coated steel sheet as set forth in [1] or [2].

[5] The arc welding method of zinc-coated steel sheet as set forth in [4], characterized in that the zinc-coated steel sheet other than coating further comprises one or both of Nb and V, and the total amount of Nb and V being 0.01 to 0.20%.

Advantageous Effect of Invention

According to the stainless steel flux-cored welding wire for zinc-coated steel sheet welding use and the arc welding method of a zinc-coated steel sheet using the same of the present invention, even without touchup or other post treatment, the corrosion resistance is good, no weld cracking occurs, the ductility of the weld zone is good, further, the weld work efficiency is excellent, and otherwise a high quality weld zone is obtained.

In particular, a pronounced effect is exhibited in welding Zn—Al—Mg-based alloy plated steel sheet which contains Al and Mg as alloy elements. As the Zn—Al—Mg-based alloy plated steel sheet, there are, for example, "Super Dyma®" steel sheet made by Nippon Steel Corporation which contains Al 11%, Mg 3%, and Si 0.2% and has a balance of mainly Zn, "ZAM®" steel sheet made by Nisshin Steel Co., Ltd. which contains Al 7% and Mg 3% and has a balance of mainly Zn, etc.

BRIEF DESCRIPTION OF DRAWINGS

FIG. 1 is a view showing the relationship between the total amount of slag and the content of $TiO_2$ in regard to the cracking of the base metal heat affected zone and weld work efficiency.

FIG. 2 is a view showing the relationship between the F value and the number of cracks of the weld metal.

DESCRIPTION OF EMBODIMENTS

Figure 3A:
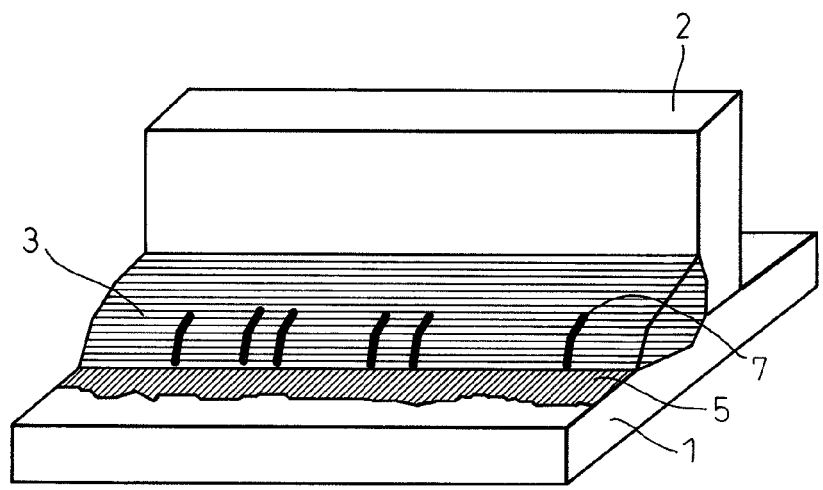
FIG. 3A is a view schematically showing, by a perspective view, cracking which occurs at the weld metal.
Figure 3B:
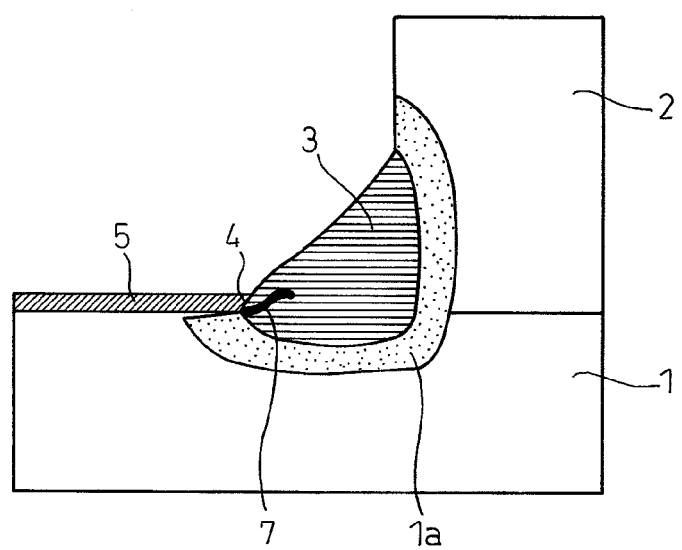
FIG. 3B is a view schematically showing, by a cross-sectional view, cracking which occurs at the weld metal.
Figure 4A:
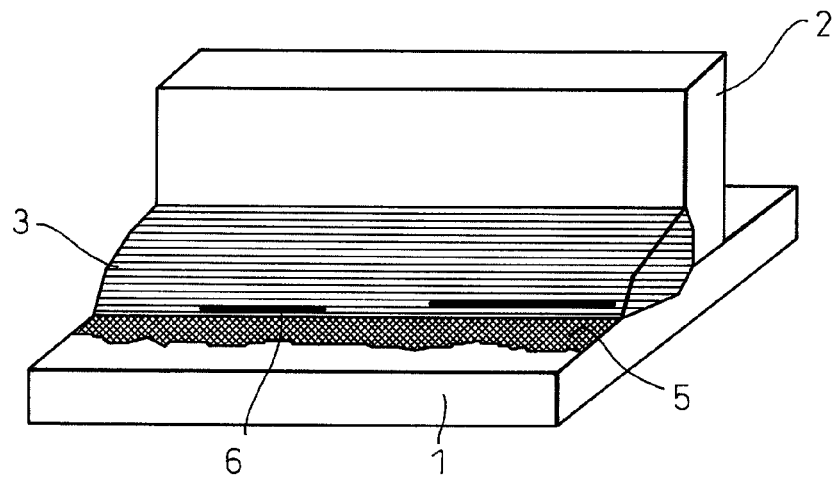
FIG. 4A is a view schematically showing, by a perspective view, cracking which occurs at the base metal heat affected zone.
Figure 4B:
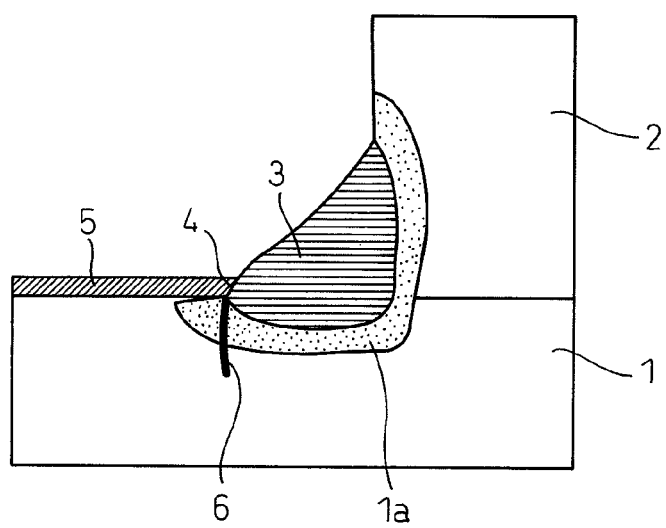
FIG. 4B is a view schematically showing, by a cross-sectional view, cracking which occurs at the base metal heat affected zone.

The inventors engaged in an intensive study of means for suppressing zinc plating cracking of the weld metal and securing ductility of the weld metal for stainless steel-based welding material for zinc-coated steel sheet which enables improvement of the corrosion resistance of the weld zone and, furthermore, for suppressing the occurrence of zinc embrittlement cracking of the base metal heat affected zone and improving the weld work efficiency.

Note that, in the present invention, the "zinc-coated steel sheet" means not only a simple zinc-coated steel sheet, but also any plated steel sheet plated on its surface by, among zinc plating, an Zn—Al-based alloy plating, Zn—Al—Mg-based alloy plating, or Zn—Al—Mg—Si-based alloy plating to which Al, Mg, Si, etc. are added for improving the corrosion resistance.

First, the means for suppressing zinc embrittlement cracking of the weld metal and securing ductility of the weld metal will be explained. According to the results of experiments, the inventors confirmed that by keeping the amount of ferrite in the weld metal suitable, it is possible to both suppress zinc embrittlement cracking of the weld metal and secure ductility. Further, they discovered that the ease of precipitation of ferrite at the time of solidification of the weld metal can be represented by the F value defined by the following formula (1) based mainly on the ferrite forming elements of Si and Cr in the weld metal and the austenite forming elements of C, Mn, and Ni:

$$F \text{ value} = 3 \times [\text{Cr \%}] + 4.5 \times [\text{Si \%}] - 2.8 \times [\text{Ni \%}] - 84 \times [\text{C \%}] - 1.4 \times [\text{Mn \%}] - 19.8 \qquad (1)$$

where the [Cr %], [Si %], [Ni %], [C %], and [Mn %] respectively indicate totals of Cr, Si, Ni, C, and Mn contained in the sheath and wire in the welding wire with respect to the total mass of the wire.

FIG. 2 shows the relationship between the F value of flux-cored welding wire used when welding zinc-coated steel sheets and the number of zinc embrittlement cracks (welding conditions etc. same as performance survey of welded joint of examples explained later).

When the F value of the flux-cored welding wire is less than 30, solidification ends with the primary crystal solidified phase of the weld metal being austenite alone or the solidification ends with the primary crystal solidified phase being ferrite, but in the middle of solidification, austenite precipitating and resulting in the two phases of ferrite and austenite. At this time, the austenite phase solidifies in the form of columnar crystals, so at the time of welding, Zn and other low melting point components derived from the zinc plating penetrate to the austenite grain boundaries making the weld metal more susceptible to zinc embrittlement cracking. On the other hand, it was learned that when the F value of the flux-cored welding wire is 30 or more, the weld metal precipitates as primary crystals as ferrite and the solidification is completed in the ferrite single phase, so the finer ferrite phase resulting from the solidified equiaxial crystals makes penetration of zinc and other low melting point components to the crystal grain boundaries at the time of welding difficult, and zinc embrittlement cracking of the weld metal is reduced. Furthermore, it became clear that when the F value is 40 or more, the amount of austenite which precipitates in the cooling process after solidification of the weld metal becomes smaller and the effect of suppression of zinc embrittlement cracking becomes more pronounced.

Based on these findings, in the present invention, as explained later, the contents of C, Si, Mn, Ni, and Cr in the flux-cored welding wire are made suitable values and, to suppress zinc embrittlement cracking of the weld metal, the F value of the welding wire, defined by the above formula (1), is made 30 or more, preferably 40 or more.

From the viewpoint of the suppression of zinc embrittlement cracking, preferably the higher the F value of the welding wire the better. However, if the F value of the wire exceeds 50, the weld metal finishes solidifying in the ferrite single phase, then the precipitation of austenite is extremely reduced in the cooling process down to room temperature, so the amount of ferrite in the weld metal at room temperature becomes greater. To secure the ductility of the weld metal, that is, the elongation, predetermined precipitation of austenite is necessary. An excessive increase in the F value is not preferable. Therefore, in the present invention, the weld metal structure at room temperature is made a suitable two-phase structure of ferrite and austenite so as to suppress zinc embrittlement cracking of the weld metal and the upper limit of the F value of the wire is made 50 to sufficiently secure ductility of the weld metal.

Figure 5:
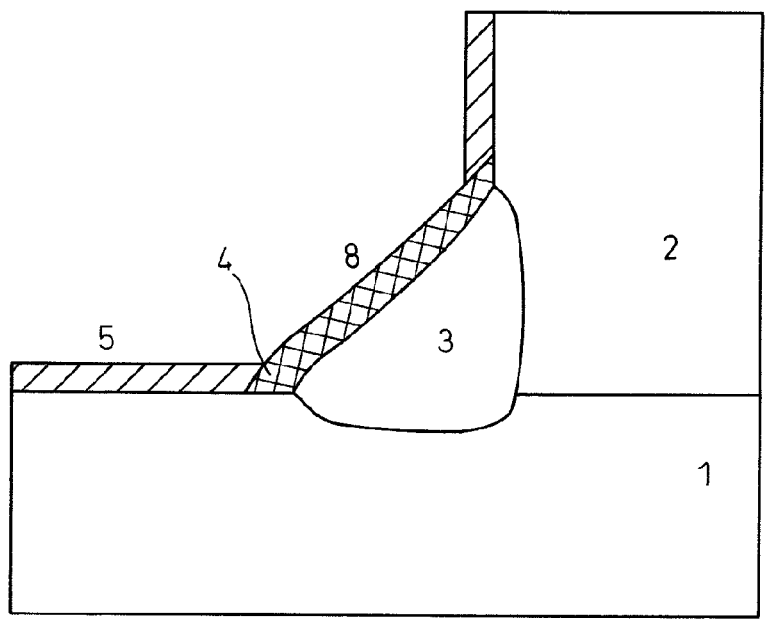
FIG. 5 is a view schematically showing, by a cross-sectional view, the state of preventing zinc embrittlement cracking of the base metal heat affected zone by solidified slag covering the weld zone.

Next, the inventors engaged in an intensive study of means for preventing the zinc embrittlement cracking of the base metal heat affected zone and improvement of the weld work efficiency. As a result, they discovered that for preventing the zinc embrittlement cracking of the base metal heat affected zone, as shown in FIG. 5, it is important to use the solidified slag 8 which covers the weld metal 3 so as to prevent penetration of molten zinc 5 to the weld toe 4 and important to optimize the component composition of the slag forming agents for improvement of the weld work efficiency.

The present invention, based on these findings, has as its technical ideas that:

(a) by raising the content of $TiO_2$ in the slag forming agents and forming solidified slag with a relatively high melting point and by relatively increasing the total amount of the slag forming agents, the weld metal can be surrounded well in the high temperature state and penetration of molten zinc to the weld toe can be prevented and (b) by defining the upper limit of the content of $TiO_2$ in the slag forming agents and stabilizing the properties of movement of molten drops from the front end of the welding wire to the steel sheet base material, spatter can be reduced and the weld work efficiency is improved.

Figure 6:
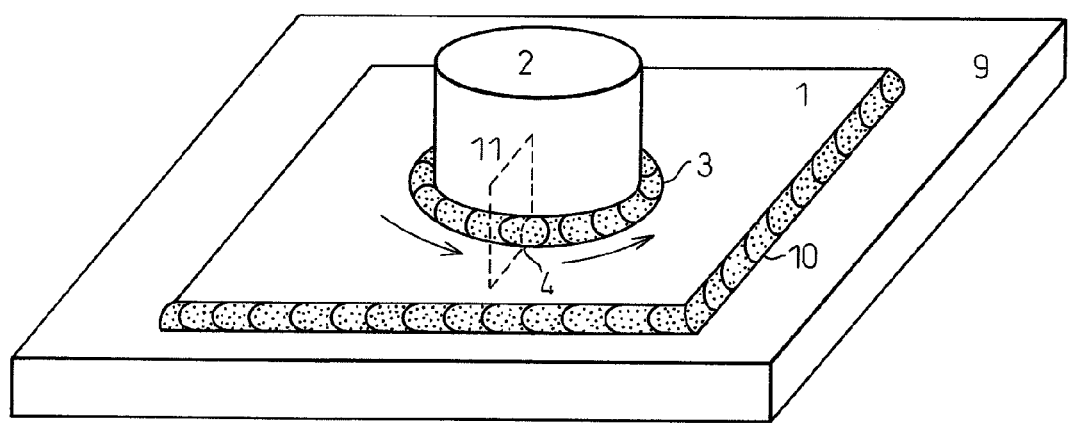
FIG. 6 is a view schematically showing, by a perspective view, the method of evaluation of zinc embrittlement cracking of the base metal heat affected zone.

Below, the means for preventing the zinc embrittlement cracking of the base metal heat affected zone will be explained. Note that, in a usual butt welded joint or fillet welded joint, reproduction of zinc embrittlement cracking of the base metal heat affected zone is not necessarily easy, so a special weld test piece is used for evaluation. That is, as shown in FIG. 6, a plate steel sheet 1 to be evaluated is set on a thick-gauge steel material 9 of a thickness of 9 mm and its four sides are fillet welded to it so as to raise the constraining force of the plated steel sheet.

Furthermore, a round steel bar 2 was placed on the plated steel sheet 1 and welded at its girth by fillet welding to set conditions for a higher shrinkage stress at the time of welding. After the completion of the welding, the cross-section 1 of the crater part of the weld bead (toe) was observed to evaluate the state of occurrence of zinc embrittlement cracking of the base metal heat affected zone.

FIG. 1 shows the results of investigation of the state of occurrence of the zinc embrittlement cracking of the base metal heat affected zone using welding wire having $TiO_2$, $SiO_2$, and $ZrO_2$ as main components of the slag material. It is learned that by making the ratio of $TiO_2$ 50% or more and making the total amount of slag 7.5% or more, it is possible to prevent zinc embrittlement cracking. The mechanism of prevention of the zinc embrittlement cracking of the base metal heat affected zone is considered to be the slag 8 solidified after welding becoming a barrier and preventing the penetration of the molten zinc 5 to the base metal heat affected zone 1a (weld toe 4). For this reason, it is believed that by increasing the ratio of $TiO_2$ and raising the melting point of the slag material, a strong barrier results. Further, it is believed that by increasing the total amount of the slag material, it becomes possible to sheath the weld toe thickly (greatly) by slag and that this is effective for suppressing penetration of the molten zinc.

On the other hand, regarding the weld work efficiency, it is learned that if the ratio of content of the $TiO_2$ is over 65%, spatter frequently occurs. It is believed that an increase in the amount of addition of $TiO_2$ results in the melting point of the slag material becoming too high, so it becomes hard for the molten slag to separate from the tip of the welding wire and as a result the property of movement of the molten drops becomes unstable and spatter increases.

For this reason, from the viewpoint of the prevention of the zinc embrittlement cracking of the base metal heat affected zone, it is effective to make the content of $TiO_2$ with respect to the total amount of the slag forming agent 50% or more, but from the viewpoint of the suppression of spatter, the content of $TiO_2$ has to be restricted to 65% or less.

The above were the reasons for limitation of the F value for preventing zinc embrittlement cracking and securing ductility of the weld metal and the reasons for limitation of the total amount of the slag forming agents in the welding wire and the ratio of content of $TiO_2$ for prevention of zinc embrittlement cracking of the base metal heat affected zone and suppression of spatter. Furthermore, to maintain the properties of the weld metal and various aspects of weld work efficiency well, it is necessary to limit the components added in the flux-cored welding wire as metal or alloy and the slag forming agents as follows. Note that, in the following explanation, "%" means "mass %" unless particularly explained otherwise.

First, the reasons for addition of the components of Si, Mn, Ni, and Cr forming the alloy composition of the weld metal will be explained.

C is harmful to the corrosion resistance, but is added in 0.01% or more for the purposes of securing the strength of the weld metal and stabilizing the arc state at the time of welding. On the other hand, if adding over 0.05%, a large number of carbides precipitate, so the ductility of the weld metal falls. Therefore, the C included as a metal or alloy in the flux-cored welding wire has to be made 0.01 to 0.05%.

Si is added in 0.1% or more for the purpose of improving the slag detachability. On the other hand, if adding over 1.5%, low melting point $SiO_2$-based oxides precipitate, so the ductility of the weld metal falls. Therefore, the S included as a metal or alloy in the flux-cored welding wire has to be made 0.1 to 1.5%.

Mn is added in 0.5% or more for the purpose of stabilizing the austenite phase in the weld metal structure at room temperature and obtain ductility of the weld metal. On the other hand, if adding over 3.0%, the slag detachability becomes poor. Therefore, the Mn included as a metal or alloy in the flux-cored welding wire has to be made 0.5 to 3.0%.

Ni is an austenite forming element. It has to be added in 7.0% or more for the purpose of stabilizing the austenite phase in the weld metal structure at room temperature and obtaining the ductility of the weld metal. On the other hand, if adding over 10.0%, it promotes the segregation of P, S, and other trace components harmful to cracking resistance and results in further susceptibility to zinc embrittlement cracking. Therefore, the Ni which is included in the flux-cored welding wire as a metal or alloy has to be made 7.0 to 10.0%, preferably 8.0 to 10.0%.

Cr is an element which contributes to the improvement of the corrosion resistance of the weld metal. Further, Cr is a ferrite forming element. It makes the weld metal a ferrite single phase when solidification is completed and contributes to suppression of zinc embrittlement cracking of the weld metal. In the present invention, the content of Cr is made 26.0% or more so as to sufficiently obtain corrosion resistance of the weld metal. Usually, if the weld metal of stainless steel contains about 13.0% of Cr, a good corrosion resistance is obtained, but the present invention considers application to zinc-coated steel sheet not containing Cr and the ability to obtain an amount of Cr of the weld metal of about 13% even if the base material is diluted about 50%. Therefore, 26.0% or more of Cr becomes required. On the other hand, if adding over 30.0%, precipitation of $Cr_{23}C_6$ or other carbides or the σ-phase becomes easier and ductility can no longer be obtained. Therefore, the Cr which is included in the flux-cored welding wire as metal or alloy has to be made 26.0 to 30.0%.

The contents of the components of C, Si, Mn, Ni, and Cr which are included in the above flux-cored welding wire as metal or alloy (totals of mass % with respect to the total mass of the welding wire), as explained above, are set so that the F value, defined by the above formula (1), becomes 30 to 50 in range so as to suppress zinc embrittlement cracking of the weld metal and secure ductility of the weld metal well.

Furthermore, for improving the detachability of the solidified slag, it is possible to add Bi in an amount of 0.01% or more with respect to the total mass of the wire. In particular, the weld zone of the plated steel sheet has to be sufficiently cleaned of solidified slag from the viewpoint of the improvement of the appearance, so the slag detachability becomes important. However, if the amount of addition of Bi exceeds 0.1%, it becomes a cause of segregation of Bi at the time of solidification of the weld metal and resultant hot cracks. Therefore, the amount of addition of Bi to the total mass of the wire was made 0.1% or less.

Note that, in addition to the components defined in the present invention, it is also possible to combine and add, as other components, Mo, Cu, V, Nb, N, and other alloy agents for the purpose of adjusting the 0.2% yield strength, tensile strength, ductility (total elongation), 0° C. Charpy impact absorption energy, and other mechanical performance of the weld metal, adjusting the slag detachability, etc.

However, N causes deterioration of the ductility, so it is preferably made less than 0.05%. Further, it is also possible to suitably add and adjust Al, Mg, Ti, and other deoxidizing agents for the purpose of deoxidation of the weld zone.

Next, the reasons for addition and the reasons for limitation of the components of the slag forming agents $TiO_2$, $SiO_2$, $ZrO_2$, and $Al_2O_3$ will be explained.

$TiO_2$ is the most important slag forming agent for preventing the zinc embrittlement cracking of the base metal heat affected zone. To obtain slag with a good sheathability, 3.8% or more is necessary. On the other hand, if adding over 6.8%, the weld bead shape becomes uneven and the spatter increases. Therefore, the $TiO_2$ which is included in the flux of the flux-cored welding wire as a slag forming agent has to be made 3.8 to 6.8%. Further, if referring further to the slag sheathability of $TiO_2$, by adding a suitable amount together with the later explained $SiO_2$, it becomes possible to obtain a sheathed state of the slag giving a suitable thickness to the toe. This effectively acts to prevent penetration of molten zinc to the toe.

$SiO_2$ is added in 1.8% or more for improving the slag detachability and obtaining a smooth weld bead shape. On the other hand, if adding over 3.8%, the spatter increases. Therefore, the $SiO_2$ which is included in the flux of the flux-cored welding wire as the slag forming agent is preferably 1.8 to 3.8%. Further, if referring further to the slag detachability of $SiO_2$, it is added for the purpose of improving the slag detachability of the weld bead as a whole regardless of fixing the zinc.

$ZrO_2$ can be added in accordance with need for the purpose of obtaining a good slag detachability even if zinc sticks to the slag of the weld toe. However, even if adding over 1.3%, the spatter increases or the weld bead shape becomes uneven. Therefore, the $ZrO_2$ which is included in the flux of the flux-cored welding wire as the slag forming agent is preferably 1.5% or less.

$Al_2O_3$ suppresses zinc embrittlement cracking and, further, can be added in accordance with need for the purpose of improving the arc stability even in an arc atmosphere contaminated by zinc vapor. However, if added over 0.5%, the slag detachability is lowered. Therefore, as the slag forming agent in the flux of the flux-cored welding wire, $Al_2O_3$ is preferably made 0.5% or less.

As other slag forming agents other than the $TiO_2$, $SiO_2$, $ZrO_2$, and $Al_2O_3$, potassium silicate, sodium silicate, and other fixing agents which are added when producing bond flux in the process of production of welding wire, $Na_2O$, $K_2O$, $CaCO_3$, $BaCO_3$, and other metal oxides or metal carbonates which are mainly used as arc stabilizers, and $AlF_3$, NaF, $K_2ZrF_6$, LiF, and other fluorides and FeO, $Fe_2O_3$, and other iron oxides etc. which are mainly used for adjusting the slag viscosity and securing slag detachability may be suitably added.

However, if the total amount of the slag forming agent is over 10.5%, the amount of spatter caused increases at the time of welding. Therefore, the total amount of the slag forming agents of the flux-cored welding wire is made 10.5% or less.

The method of production of the stainless steel flux-cored welding wire for zinc-coated steel sheet welding use of the present invention is not particularly limited. It is possible to produce it by a usually known method of production of a flux-cored welding wire.

For example, steel strip (sheath) comprised of austenitic stainless steel containing the metal or alloy was formed into a U-shape, then was filled with a filling flux obtained by mixing, stirring, and drying the metal or alloy and the slag forming agent in the U-shaped groove, then the steel strip (sheath) was further shaped into a tube which continued to be drawn until the desired wire diameter.

At this time, it is also possible to weld the seams of the sheath formed into the tube shape to obtain a seamless type flux-cored welding wire.

Further, as a method other than the above, when using a pipe formed into a tube in advance as the sheath, the pipe is filled with flux while making it vibrate and is drawn until a predetermined wire diameter.

The zinc-coated steel sheet of the welded material which is covered by the present invention includes not only a general molten zinc-coated steel sheet based on JIS G 3302, but also a molten zinc-5% aluminum alloy plated steel sheet based on JIS G 3317, molten 55% aluminum-zinc alloy plated steel sheet based on JIS G 3321, Zn-11% Al-3% Mg-0.2% Si plated steel sheet (Super Dyma®), Zn-7% Al-3% Mg plated steel sheet (ZAM®), and other zinc-based alloy coated steel sheets.

Note that, the zinc embrittlement cracking of the base metal heat affected zone which occurs when using a stainless steel-based welding material particularly easily occurs when the plating components include Mg. For this reason, when welding the plated steel sheet containing Mg (Zn-11% Al-3% Mg-0.2% Si plated steel sheet) and Zn-7% Al-3% Mg plated steel sheet) by the stainless steel flux-cored welding wire of the present invention, the effect of suppression of the zinc embrittlement cracking of the base metal heat affected zone becomes pronounced.

As the Zn—Al—Mg—Si-based alloy plated steel sheet, it is possible to effectively apply a zinc-based alloy coated steel sheet containing, by mass %, Al: 2 to 19%, Mg: 1 to 10%, and Si: 0.01 to 2% and having a balance of Zn and unavoidable impurities.

Explaining the zinc-based alloy coating components, Mg is included in 1 to 10% for the purpose of improving the corrosion resistance of the plating layer. This is because if less than 1%, the effect of improvement of the corrosion resistance is insufficient, while if over 10%, the plating layer becomes brittle and the adhesion falls. Al keeps the addition of Mg from causing the plating layer to become brittle and improves the corrosion resistance, so is included in 2 to 19%. If less than 2%, the effect due to addition becomes insufficient, the plating layer becomes brittle, and the adhesion falls, while if over 19%, the effect of improvement of the corrosion resistance becomes saturated and simultaneously the Al and the Fe in the steel sheet react to cause a drop in adhesion. Si keeps the Al and the Fe in the steel sheet from reacting, the plating layer from becoming brittle, and the adhesion from falling, so 0.01 to 2% is included. This is because if less than 0.01%, the effect is not sufficient and the adhesion falls. If over 2%, not only does the effect of improvement of the adhesion become saturated, but also the plating layer itself becomes brittle. Furthermore, as the zinc-based alloy coating components, to improve the corrosion resistance after painting, one or more elements of Ca, Be, Ti, Cu, Ni, Co, Cr, and Mn may be added.

Further, as the zinc-coated steel sheet of the welded material which is covered by the present invention, use of a zinc-coated steel sheet with a tensile strength of the plating base sheet of the 270 MPa to 590 MPa class and defining the steel sheet components of the plating base sheet as follows is preferable since the effect of suppression of the zinc embrittlement cracking of the base metal heat affected zone becomes more pronounced.

C is added in 0.01% or more for improvement of the hardenability of the weld heat affected zone (below, also referred to as "HAZ") and therefore suppressing zinc embrittlement cracking of the HAZ. On the other hand, excessive addition leads to a drop in bendability and an increase in delayed cracking due to hardening of the HAZ and easier zinc embrittlement cracking. For this reason, the upper limit is made 0.2%.

Si is added in 0.01% or more for deoxidation of the steel sheet. On the other hand, excessive addition leads to an excessive increase in oxide scale at the time of hot rolling and a drop in ductility, so the upper limit is made 2.0%.

Mn is added in 0.5% or more to immobilize the unavoidable impurity S as MnS and to improve the hardenability of the HAZ. On the other hand, excessive addition leads to a drop in bendability and an increase in delayed cracking, so the upper limit is made 3.0%.

P is an impurity element. To prevent a drop in workability of the steel sheet, the upper limit is made 0.020%.

S is an impurity element. To prevent high temperature cracking of the weld metal and a drop in workability at the time of hot rolling, the upper limit is made 0.020%.

Al has to be added in 0.001% or more as a deoxidizing element of steel, but if excessively added, coarse nonmetallic inclusions are formed and the toughness and other performance of the steel material are lowered, so the upper limit value was made 0.5%.

Ti immobilizes the N in the steel as nitrides and has the effect of preventing the precipitation of BN, so is added in 0.001% or more. On the other hand, excessive addition leads to a rise in the cost of alloy addition, so 0.5% is made the upper limit.

B is added in 0.0003% or more to obtain a reduction in interfacial energy of the crystal grain boundaries of the HAZ and resultant effect of suppression of zinc embrittlement cracking. On the other hand, excessive addition invites a drop in toughness of the weld zone, zinc easily penetrates to the crystal grain boundaries of the weld heat affected zone, and, conversely, zinc embrittlement cracking easily occurs, so the upper limit is made 0.004%.

N is added in 0.0005% or more to make B precipitate as BN or another nitride. On the other hand, it lowers the effect of B in suppressing zinc embrittlement cracking, so the upper limit is made 0.006%.

Furthermore, the zinc-coated steel sheet may have Nb and V added to it. Each element, by addition, has the action of securing the strength of the steel material and immobilizing N as carbides and securing an amount of solid solution B effective for suppressing molten metal embrittlement. If the total amount of Nb and V is 0.01% or more, the effect becomes pronounced. However, excessive addition of a total amount of over 0.20 mass % invites a rise in the manufacturing costs of course and degrades the toughness of the steel material. For this reason, the upper limit of the content was made 0.20%.

EXAMPLES

Below, examples will be used to explain the present invention in detail.

Example 1

First, to confirm the effect of suppression of zinc embrittlement cracking, the inventors investigated the effects of the welding material and the type of the plating.

In the stainless steel flux-cored welding wires containing the alloy compositions shown in Table 1, stainless steel flux-cored welding wires with slag forming agents of the compositions shown in Table 1 and able 3 were prepared. The asterisks (*) in Table 1 and Table 3 indicate contents of the extent of unavoidable impurities. The wire diameter was made 1.2 mm. For the zinc-coated steel sheet, zinc-based alloy coated steel sheets comprised of plating base sheets of steel sheets of a sheet thickness of 5 mm and a tensile strength of the 400 MPa class which were coated with three types of plating shown in A to C were used.

A: molten zinc-coated steel sheet based on JIS G 3302

B: molten zinc-5% aluminum alloy plated steel sheet based on JIS G 3317

C: Zn-11% Al-3% Mg-0.2% Si plated steel sheet Note that, for the steel sheet components of the plating base sheet, a steel sheet of C=0.08%, Si=0.02%, Mn=1.1%, P=0.015%, S=0.007%, Al=0.02%, B=0.0015%, N=0.003, and Ti=0.01% was used.

For the welded metal performance, a tensile test based on JIS Z 3323 and an impact test based on JIS Z 3111 were performed. The zinc embrittlement cracking of the weld metal and the zinc embrittlement cracking of the base metal heat affected zone were evaluated using a visible dye penetrant test. Note that, for the welded test piece for evaluation of cracking, as explained above, a welded test piece shown in FIG. 6 was used and was welded by a welding current of 160 to 200 A and a shield gas of $CO_2$. The weld work efficiency was judged by a functional evaluation at the time of preparing the welded test piece. These results are shown together in Table 2 and Table 4.

In Table 2 and Table 4, the "Good" in the row of "Spatter" indicates that no spatter occurred and the work efficiency was good, while "Poor" indicates that a lot of spatter occurred and the work efficiency was poor. "Good" in the row of "Slag detachability" indicates that the slag detachability was good, "Fair" indicates that the slag detachability was somewhat inferior, and "Poor" indicates that the slag detachability was poor. "Good" in the row of "Bead appearance" indicates that the bead appearance was good, while "Poor" indicates that the bead shape was uneven or the bead appearance was otherwise poor. The "Good" of the overall evaluation indicates a good evaluation, while the "Poor" indicates the evaluation could not be said to be good.

Wire Nos. 1 to 7 of Table 1 are invention examples, while Wire Nos. 8 to 14 of Table 3 are comparative examples. Further, Table 2 shows examples using the welding wire of the present invention, while Table 4 shows examples using welding wire of the comparative examples. Note that, Table 2 and Table 4 also show the types of the plating of the steel sheet used.

Wire Nos. 1 to 7 of the present invention were suitable in F value, $TiO_2$, $SiO_2$, $ZrO_2$, $Al_2O_3$, total amount of slag forming agents, and ratio of $TiO_2$ to total amount of slag forming agents, so cracking did not occur in either the weld metal or base metal heat affected zone and the work efficiency at the time of welding became good as a result.

On the other hand, Wire No. 8 in the comparative examples was low in the ratio of content of $TiO_2$ with respect to the total of the slag forming agents, so cracking occurred in the base metal heat affected zone.

Wire No. 9 was low in the total amount of the slag forming agents and was also low in the ratio of content of $TiO_2$, so cracking occurred in the base metal heat affected zone.

Wire Nos. 10 and 11 were low in total amount of the slag forming agents, so cracking occurred in the base metal heat affected zone. Further, they were low in content of $SiO_2$, so the detachability tended to be somewhat inferior.

Wire No. 12 was high in content of $TiO_2$ and was high in ratio of content of $TiO_2$ to the slag forming agent total, so spatter frequently occurred and the bead shape tended to become uneven.

Wire No. 13 was large in total amount of slag forming agents, so spatter frequently occurred. Further, it was large in F value, so was low in value of the elongation of the welded metal (underlined value of Table 4).

Wire No. 14 was low in content of $SiO_2$ and was high in content of $TiO_2$ with respect to the total of the slag forming agent, so was poor in slag detachability and, further, had frequent spatter. Furthermore, it was small in F value, so cracking occurred in the weld metal.

Example 2

Next, the inventors evaluated the effects of the components of the plating base sheet on the zinc embrittlement cracking of the weld heat affected zone of the steel sheet of the plating base sheet. The plating base sheet used is a steel material of the tensile strength of the 270 MPa class to 590 MPa class. The component composition is shown in Table 5. The underlines in Table 5 show values outside of the range of the present invention. The plating components were made the plating of Example 1 of C: Zn-11% Al-3% Mg-0.2% Si. The welding wire was the Wire No. 1 of Example 1.

For the welding test piece for evaluation of cracking, as explained above, the welding test piece shown in FIG. 6 was used. This was welded by a welding current of 160 to 200 A and a shield gas of $CO_2$. For evaluation of the zinc embrittlement cracking of the base metal heat affected zone, a visible dye penetrant test was used. Note that, the sheet thickness was made a thin 2.3 mm and the evaluation was performed in a state facilitating zinc embrittlement cracking.

The Plating Base Sheet Nos. 15 to 18 of Table 5 are invention examples, while the Plating Base Sheet Nos. 19 to 23 of Table 5 are comparative examples.

When using the plating base sheets of Nos. 15 to 18 of the present invention, cracking did not occur at either the weld metal or base metal heat affected zone.

On the other hand, when using the plating base sheet of No. 19 of the comparative examples, since the content of B was low, cracking occurred in the base metal heat affected zone.

When using the plating base sheet of No. 20 of the comparative examples, since the content of B was excessive, cracking occurred at the base metal heat affected zone.

When using the plating base sheet of No. 21 of the comparative examples, since the content of Mn was small, the base metal heat affected zone fell in hardenability and therefore cracking occurred due to the increase in heat stress of the weld toe.

When using the plating base sheet of No. 22 of the comparative examples, since the content of Ti was small and the precipitation of BN increased, cracking occurred at the base metal heat affected zone.

When using the plating base sheet of No. 23 of the comparative examples, since the content of C was excessive, cracking occurred at the base metal heat affected zone and there was a concern of delayed fracture due to hardening of the weld zone.

TABLE 1

| | Wire no. | 1 | 2 | 3 | 4 | 5 | 6 | 7 |
|---|---|---|---|---|---|---|---|---|
| Mass % of filled flux to total mass of wire | $TiO_2$ | 3.82 | 4.50 | 5.33 | 5.60 | 6.74 | 4.50 | 5.30 |
| | $SiO_2$ | 1.98 | 2.40 | 2.82 | 2.90 | 2.18 | 1.88 | 3.10 |
| | $ZrO_2$ | 0.43 | * | * | * | 0.76 | 0.56 | * |
| | $Al_2O_3$ | 0.07 | 0.12 | 0.07 | 0.31 | 0.06 | 0.25 | 0.43 |
| | $FeO + Fe_2O_3$ | 0.50 | 0.50 | 0.01 | 0.01 | 0.20 | 0.10 | 0.10 |
| | $Na_2O$ | 0.10 | 0.05 | 0.10 | 0.10 | 0.10 | 0.08 | 0.10 |
| | $K_2O$ | 0.10 | 0.05 | 0.11 | 0.11 | 0.10 | * | * |
| | $AlF_3$ | * | * | * | * | * | * | * |
| | NaF | 0.10 | 0.20 | 0.79 | 0.79 | 0.20 | * | * |
| | $K_2ZrF_6$ | * | * | * | * | * | 0.10 | 0.10 |

TABLE 1-continued

|  | Wire no. | 1 | 2 | 3 | 4 | 5 | 6 | 7 |
|---|---|---|---|---|---|---|---|---|
|  | LiF | * | * | * | 0.10 | * | * | * |
|  | Other slag forming agents | 0.50 | 0.70 | 0.10 | 0.10 | 0.10 | 0.10 | 0.10 |
|  | Total of slag forming agents | 7.60 | 8.52 | 9.33 | 10.02 | 10.44 | 7.57 | 9.23 |
|  | $TiO_2$/slag forming agent total | 0.50 | 0.53 | 0.57 | 0.56 | 0.65 | 0.59 | 0.57 |
|  | C | * | * | * | * | * | * | 0.03 |
|  | Si | * | 0.50 | 1.00 | * | * | 0.65 | 0.65 |
|  | Mn | * | * | * | 0.20 | 1.80 | * | * |
|  | Ni | 0.30 | 1.30 | 1.00 | * | 0.50 | 0.20 | 0.20 |
|  | Cr | 13.00 | 12.10 | 13.00 | 15.00 | 14.00 | 14.00 | 14.00 |
|  | Fe | 3.95 | 0.50 | 3.50 | * | * | * | * |
|  | Bi | 0.05 | 0.05 | 0.03 | 0.05 | 0.05 | * | 0.02 |
|  | Mo | 0.10 | 0.05 | 0.10 | * | * | * | * |
|  | Filling rate % | 25.0 | 23.0 | 28.0 | 25.3 | 26.8 | 22.4 | 24.1 |
|  | Sheath rate % | 75.0 | 77.0 | 72.0 | 74.7 | 73.2 | 77.6 | 75.9 |
| Mass % of chemical components of sheath | C | 0.021 | 0.018 | 0.018 | 0.018 | 0.021 | 0.021 | 0.021 |
|  | Si | 0.57 | 0.41 | 0.41 | 0.41 | 0.57 | 0.57 | 0.57 |
|  | Mn | 0.98 | 1.60 | 1.60 | 1.60 | 0.98 | 0.98 | 0.98 |
|  | Ni | 9.1 | 10.3 | 10.3 | 10.3 | 9.1 | 9.1 | 9.1 |
|  | Cr | 18.3 | 18.6 | 18.6 | 18.6 | 18.3 | 18.3 | 18.3 |
| Mass % of chemical components of wire | C | 0.016 | 0.014 | 0.013 | 0.013 | 0.015 | 0.016 | 0.046 |
|  | Si | 0.43 | 0.82 | 1.30 | 0.31 | 0.42 | 1.09 | 1.08 |
|  | Mn | 0.74 | 1.23 | 1.15 | 1.40 | 2.52 | 0.76 | 0.74 |
|  | Ni | 7.13 | 9.23 | 8.42 | 7.70 | 7.16 | 7.26 | 7.10 |
|  | Cr | 26.73 | 26.42 | 26.40 | 28.90 | 27.40 | 28.19 | 27.88 |
|  | F value | 40.0 | 34.4 | 38.9 | 43.6 | 39.4 | 46.9 | 43.9 |
|  | Class | Invention examples | | | | | | |

TABLE 2

|  | Wire no. | 1 | 2 | 3 | 4 | 5 | 6 | 7 |
|---|---|---|---|---|---|---|---|---|
|  | Type of plating | A | C | C | B | C | C | B |
| Weld metal performance | 0.2% yield strength Mpa | 604 | 587 | 608 | 624 | 612 | 599 | 611 |
|  | Tensile strength Mpa | 702 | 669 | 705 | 735 | 715 | 698 | 708 |
|  | Elongation % | 16 | 21 | 18 | 12 | 16 | 19 | 15 |
|  | vE 0° C. J | 18 | 22 | 24 | 28 | 19 | 21 | 20 |
| Cracking | Weld metal cracking | No | No | No | No | No | No | No |
|  | Base metal heat affected zone cracking | No | No | No | No | No | No | No |
| Weld work efficiency | Spatter | Good | Good | Good | Good | Good | Good | Good |
|  | Slag detachability | Good | Good | Good | Good | Good | Good | Good |
|  | Bead appearance | Good | Good | Good | Good | Good | Good | Good |
|  | Overall evaluation | Good | Good | Good | Good | Good | Good | Good |
|  | Class | Invention examples | | | | | | |

TABLE 3

|  | Wire no. | 8 | 9 | 10 | 11 | 12 | 13 | 14 |
|---|---|---|---|---|---|---|---|---|
| Mass % of filled flux to total mass of wire | $TiO_2$ | <u>1.70</u> | <u>3.31</u> | <u>3.50</u> | 4.50 | <u>6.94</u> | 6.65 | 6.46 |
|  | $SiO_2$ | <u>3.62</u> | 2.80 | <u>1.55</u> | <u>1.33</u> | 2.83 | 1.80 | <u>1.40</u> |
|  | $ZrO_2$ | <u>2.40</u> | * | * | 0.72 | * | <u>1.40</u> | * |
|  | $Al_2O_3$ | 0.07 | 0.31 | 0.12 | 0.20 | 0.03 | 0.01 | <u>0.60</u> |
|  | $FeO + Fe_2O_3$ | 0.20 | 0.50 | 0.50 | * | * | 0.50 | 0.30 |
|  | $Na_2O$ | 0.10 | 0.05 | 0.10 | 0.05 | * | 0.10 | 0.10 |
|  | $K_2O$ | 0.10 | 0.05 | 0.10 | * | 0.10 | * | 0.10 |
|  | $AlF_3$ | * | * | * | * | * | * | * |
|  | NaF | 0.20 | 0.20 | * | * | * | 0.10 | 0.20 |
|  | $K_2ZrF_6$ | * | * | 0.15 | * | 0.07 | * | * |
|  | LiF | * | * | * | 0.10 | * | * | * |
|  | Other slag forming agent | 0.10 | 0.10 | 0.30 | 0.10 | * | 0.20 | 0.25 |
|  | Total of slag forming agents | 8.49 | <u>7.32</u> | <u>6.32</u> | <u>7.00</u> | 9.97 | <u>10.76</u> | 9.41 |
|  | $TiO_2$/Slag forming agent total | <u>0.20</u> | <u>0.45</u> | 0.55 | 0.64 | <u>0.70</u> | 0.62 | <u>0.69</u> |
|  | C | * | * | * | * | * | * | * |
|  | Si | * | 0.50 | 1.00 | * | * | 0.80 | 0.80 |

TABLE 3-continued

| Wire no. | | 8 | 9 | 10 | 11 | 12 | 13 | 14 |
|---|---|---|---|---|---|---|---|---|
| | Mn | * | * | * | 0.20 | 1.80 | * | 2.00 |
| | Ni | 0.30 | 1.30 | 1.00 | * | 0.50 | 0.20 | 2.00 |
| | Cr | 13.00 | 12.10 | 13.00 | 15.00 | 14.00 | 16.00 | 12.00 |
| | Fe | 3.95 | 0.50 | 3.50 | * | * | * | * |
| | Bi | 0.05 | 0.05 | 0.03 | 0.05 | 0.05 | 0.02 | 0.05 |
| | Mo | 0.10 | 0.05 | 0.10 | * | * | * | 0.35 |
| | Filling rate % | 25.9 | 21.8 | 25.0 | 22.3 | 26.3 | 27.8 | 26.6 |
| | Sheath rate % | 74.1 | 78.2 | 75.0 | 77.7 | 73.7 | 72.2 | 73.4 |
| Mass % of chemical components of sheath | C | 0.021 | 0.018 | 0.018 | 0.018 | 0.021 | 0.021 | 0.021 |
| | Si | 0.57 | 0.41 | 0.41 | 0.41 | 0.57 | 0.57 | 0.04 |
| | Mn | 0.98 | 1.60 | 1.60 | 1.60 | 0.98 | 0.98 | 0.35 |
| | Ni | 9.1 | 10.3 | 10.3 | 10.3 | 9.1 | 9.1 | 10.3 |
| | Cr | 18.3 | 18.6 | 18.6 | 18.6 | 18.3 | 18.3 | 18.6 |
| Mass % of chemical components of wire | C | 0.016 | 0.014 | 0.014 | 0.014 | 0.015 | 0.015 | 0.015 |
| | Si | 0.42 | 0.82 | 1.31 | 0.32 | 0.42 | 1.21 | 0.83 |
| | Mn | 0.73 | 1.25 | 1.20 | 1.44 | 2.52 | 0.71 | 2.26 |
| | Ni | 7.04 | 9.35 | 8.73 | 8.01 | 7.20 | 6.77 | 9.56 |
| | Cr | 26.56 | 26.64 | 26.96 | 29.46 | 27.48 | 29.22 | 25.65 |
| | F value | 39.7 | 34.7 | 39.7 | 44.4 | 39.5 | 52.1 | 29.7 |
| | Class | | | | Comparative examples | | | |

TABLE 4

| | Wire no. | 8 | 9 | 10 | 11 | 12 | 13 | 14 |
|---|---|---|---|---|---|---|---|---|
| | Type of plating | C | C | C | C | B | A | C |
| Weld metal performance | 0.2% yield strength Mpa | 602 | 591 | 605 | 624 | 612 | 612 | 602 |
| | Tensile strength Mpa | 703 | 681 | 703 | 735 | 715 | 732 | 705 |
| | Elongation % | 16 | 23 | 15 | 12 | 16 | 5 | 16 |
| | vE 0° C. J | 18 | 22 | 24 | 28 | 19 | 19 | 25 |
| Cracking | Weld metal cracking | No | No | No | No | No | No | Yes |
| | Base metal heat affected zone cracking | Yes | Yes | Yes | Yes | No | No | No |
| Weld work efficiency | Spatter | Good | Good | Good | Good | Poor | Poor | Poor |
| | Slag detachability | Good | Good | Fair | Fair | Good | Good | Poor |
| | Bead appearance | Good | Good | Good | Good | Poor | Good | Good |
| | Overall evaluation | Poor | Poor | Poor | Poor | Poor | Poor | Poor |
| | Class | | | | Comparative examples | | | |

TABLE 5

| | | Chemical components (mass %) | | | | | | | | | | Tensile strength |
|---|---|---|---|---|---|---|---|---|---|---|---|---|
| | | C | Si | Mn | P | S | Al | B | N | Ti | Others | |
| Inv. ex. | 15 | 0.08 | 0.02 | 1.10 | 0.015 | 0.007 | 0.022 | 0.0015 | 0.003 | 0.010 | | 430 MPa |
| | 16 | 0.15 | 0.02 | 0.70 | 0.015 | 0.007 | 0.020 | 0.0020 | 0.003 | 0.010 | | 450 MPa |
| | 17 | 0.05 | 0.01 | 0.50 | 0.015 | 0.007 | 0.020 | 0.0020 | 0.002 | 0.006 | | 340 MPa |
| | 18 | 0.05 | 0.02 | 1.50 | 0.014 | 0.007 | 0.021 | 0.0015 | 0.003 | 0.012 | Nb = 0.02, V = 0.02 | 620 MPa |
| Comp. ex. | 19 | 0.08 | 0.02 | 1.20 | 0.015 | 0.007 | 0.020 | 0.0001 | 0.004 | 0.010 | | 420 MPa |
| | 20 | 0.15 | 0.02 | 0.70 | 0.015 | 0.007 | 0.021 | 0.0045 | 0.003 | 0.010 | | 470 MPa |
| | 21 | 0.03 | 0.01 | 0.19 | 0.017 | 0.007 | 0.010 | 0.0015 | 0.003 | 0.012 | | 310 MPa |
| | 22 | 0.08 | 0.02 | 0.70 | 0.014 | 0.007 | 0.011 | 0.0015 | 0.003 | 0.0005 | | 440 MPa |
| | 23 | 0.25 | 0.02 | 1.10 | 0.014 | 0.007 | 0.021 | 0.0020 | 0.003 | 0.011 | | 670 MPa |

Reference Signs List

| 1 | zinc-coated steel sheet (base sheet) |
| 1a | base metal heat affected zone |
| 2 | standing sheet (unplated steel sheet or plated steel sheet) or round steel bar |
| 3 | weld metal |
| 4 | weld toe |
| 5 | zinc plating (molten zinc) |
| 6 | zinc embrittlement cracking of base metal heat affected zone |
| 7 | zinc embrittlement cracking of weld metal zone |
| 8 | solidified slag covering weld metal |
| 9 | steel sheet for constraining zinc-coated steel sheet |
| 10 | weld bead for constraining zinc-coated steel sheet |
| 11 | observed cross-section of zinc embrittlement cracking occurring at base metal heat affected zone |

The invention claimed is:

1. A stainless steel flux-cored welding wire for welding of a zinc-coated steel sheet, the welding wire comprised of a stainless steel sheath in which flux is filled, characterized in that total amount of elements which are included as metals or alloy compositions in said sheath and flux are, by mass % with respect to a total mass of the welding wire, C: 0.01 to 0.05%,
Si: 0.1 to 1.5%,
Mn: 0.5 to 3.0%,
Ni: 7.0 to 10.0%, and
Cr: 26.0 to 30.0%, and
a F value which is defined by the following formula (1) is 30 to 50;

further, said flux comprises, as slag forming agents, by mass % with respect to the total mass of the wire, $TiO_2$: 3.8 to 6.8%,
$SiO_2$: 1.8 to 3.2%,
$ZrO_2$: 1.3% or less (including 0%), and
$Al_2O_3$: 0.5% or less (including 0%), and
a total amount of said slag forming agents and other slag forming agents is 7.5 to 10.5%;

furthermore, said $TiO_2$ satisfies, by mass % with respect to the total amount of slag forming agents, $TiO_2$: 50 to 65%;

a balance of said sheath and flux is Fe and unavoidable impurities;

$$F \text{ value} = 3 \times [Cr\%] + 4.5 \times [Si\%] - 2.8 \times [Ni\%] - 84 \times [C\%] - 1.4 \times [Mn\%] - 19.8 \quad (1)$$

wherein [Cr %], [Si %], [Ni %], [C %], and [Mn %] respectively indicate totals of Cr, Si, Ni, C, and Mn contained in the sheath and wire in the welding wire with respect to the total mass of the wire.

2. The stainless steel flux-cored welding wire for welding of the zinc-coated steel sheet as set forth in claim 1, further comprising Bi as a metal or alloy composition, and a total amount contained in said sheath and flux is, by mass % with respect to a total mass of the welding wire, Bi: 0.01 to 0.1%.

3. An arc welding method of zinc-coated steel sheets, characterized in that coating of the zinc-coated steel sheet is zinc-based alloy coating comprising, by mass %, Al: 2 to 19%,
Mg: 1 to 10%,
Si: 0.01 to 2% and
a balance of Zn and unavoidable impurities;

the zinc-coated steel sheet coated is arc welded, using the stainless steel flux-cored welding wire for welding of the zinc-coated steel sheet as set forth in claim 1 or 2.

4. An arc welding method of zinc-coated steel sheet, characterized in that the steel sheet other than coating of the zinc-coated steel sheet comprises, by mass %, C: 0.01 to 0.2%,
Si: 0.01 to 2.0%,
Mn: 0.5 to 3.0%,
P: 0.020% or less,
S: 0.020% or less,
Al: 0.001 to 0.5%,
Ti: 0.001 to 0.5%,
B: 0.0003 to 0.004%,
N: 0.0005 to 0.006%, and
a balance of Fe and unavoidable impurities;

the zinc-coated steel sheet coated is arc welded, using the stainless steel flux-cored welding wire for welding of zinc-coated steel sheet as set forth in claim 1 or 2.

5. The arc welding method of zinc-coated steel sheet as set forth in claim 4, characterized in that the zinc-coated steel sheet other than the coating further comprises one or both of Nb and V, and the total amount of Nb and V is 0.01 to 0.20%.

* * * * *